United States Patent Office 2,815,873
Patented Dec. 10, 1957

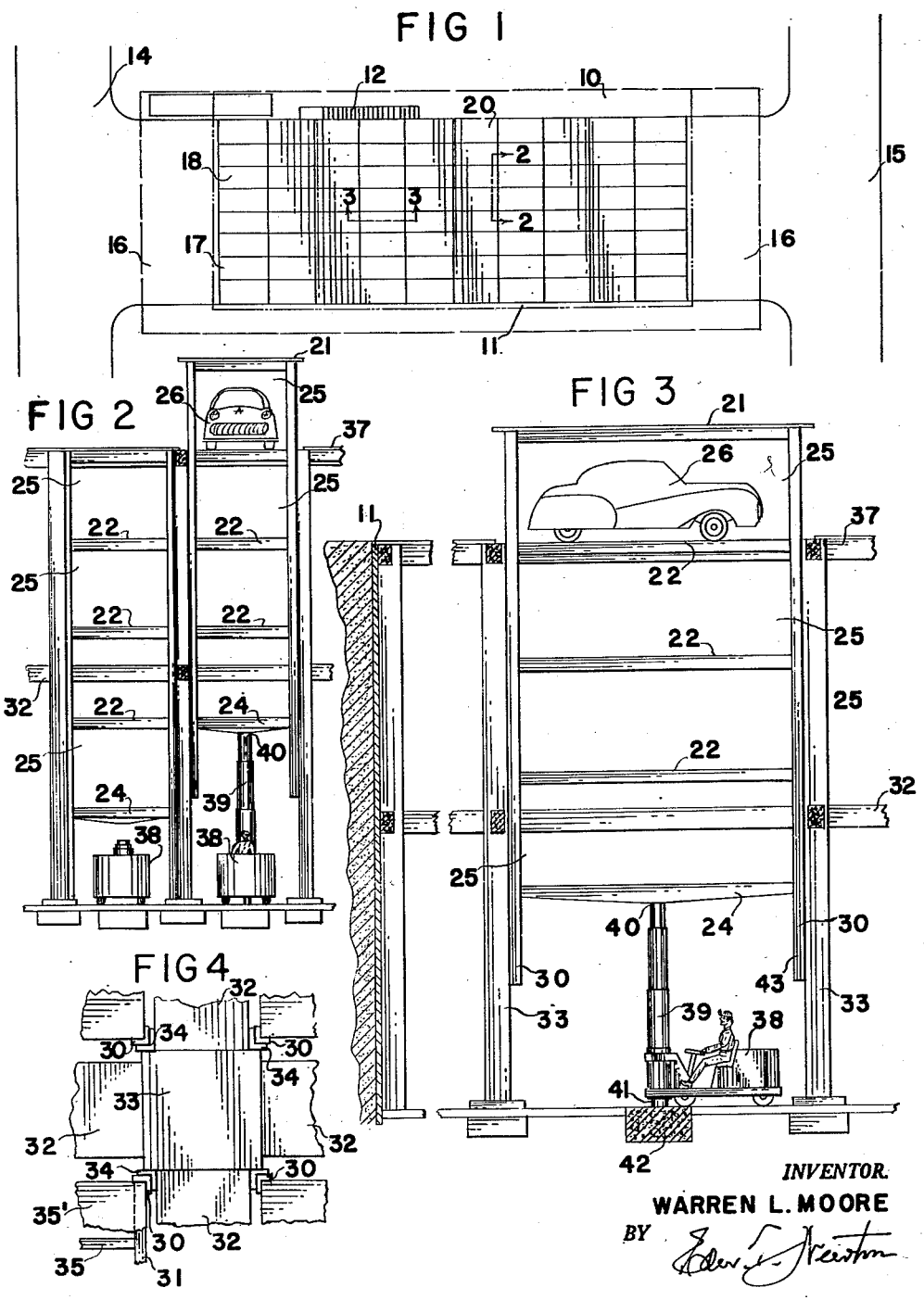

2,815,873
STORAGE FACILITIES
Warren L. Moore, Atlanta, Ga.

Application May 31, 1955, Serial No. 511,907

1 Claim. (Cl. 214—16.1)

This invention relates to storage facilities and is particularly concerned with apparatus for and methods of temporary storage whereby the articles stored may be readily disposed of and regained with a minimum of movement of associated stored units. While many of the aspects of the present invention are broadly applicable to the storage of various devices and structures, the invention is here shown and is particularly designed for the storage of motor vehicles whereby such vehicles may be compactly parked without rendering such vehicles unavailable when an elected parking time is completed.

With the tremendous growth in the number of motor vehicles and motor vehicle travel of the present era, parking and storage facilities have been increasingly more difficult to secure. Numerous and various types of multiple storage facilities for temporary or prolonged parking of motor vehicles have been suggested; however, in most instances the parking of the vehicle has been limited by the location of previously parked or stored vehicles and the removal of the vehicle from such parking has been difficult in that it frequently involves the movement of a plurality of other parked vehicles before access to the desired vehicle may be achieved. Other storage facilities have been suggested in which various mechanical means have been provided for the parking of vehicles by both vertical movement and horizontal translation thereof; however, such mechanical means have included such complicated and expensive equipment as to render such devices either economically unsound or requiring such parking fees for the maintenance and capitalization thereof as to be prohibitive. A further common difficulty involved in the use of vertical type storage or parking facilities is the requirement of individual vertical elevating means for each tier of vertically stored or parked vehicles.

With the above problems in mind, it is among the objects of the present invention to provide a novel improved storage building for reception of stored articles in vertical tiers.

A further object of the invention is to provide, as an element of such a building, vertically movable means for receiving a plurality of motor vehicles or like devices in vertical superposed and spaced relationship.

Another important object of the present invention is to provide in a device of the character set forth a single hoist means which may be moved to provide elevating facilities for any one of the selected plurality of vertically stored vehicles.

Numerous other objects, features and advantages of the present invention will be apparent from consideration of the following specification taken in conjunction with the accompanying drawings in which:

Fig. 1 is a top plan view of a vehicle parking or storage facility forming a part of the present inventive concept.

Fig. 2 is a vertical cross-sectional view of the facility of Fig. 1, taken on line 2—2 thereof.

Fig. 3 is a similar sectional view taken on a plane normal to that shown in Fig. 2 and as indicated by the line 3—3 of Fig. 1.

Fig. 4 is a detail fragmentary plan view of one of the corner structures of the facility disclosed in Fig. 1.

In general terms, that form of the present invention here shown by way of illustration may be briefly defined as comprising a building or like garage parking or storing facility including a plurality of longitudinal and transverse rows of parking spaces vertically extending in the facility and each adapted to receive a plurality of parked vehicles or the like. Each cell of the transverse and longitudinally arranged receiving sections of the building is provided with a vertically arranged plural vehicle receiving lift or elevator defining spaced vehicle receiving floors and arranged for vertical movement to and from a level to which the motor vehicle may be driven for reception in that compartment which is in registration with such level. The invention further provides for the use of a single hoist mechanism of mobile character which may be readily driven by a single operator to and from the various elevating structures and which may selectively engage such structures for inducing the required vertical movement thereof to receive and displace a motor vehicle from the driving level of the facility.

Referring now more particularly to the drawings, it will be seen from Fig. 1 that the parking or storage facility contemplated by the present invention may comprise side walls 10 and 11 wherein there may be disposed suitable facilities such as the stairway, as indicated at 12, and such equipment for maintenance repair and emergency as may be required as well as waiting lounges, rest rooms and the like. When the arrangement of the building of Fig. 1 is contemplated, the same may readily be located between parallel adjacent streets 14 and 15 to extend through the block therebetween and provided with incoming and outgoing driveways, ramps or aprons, as indicated at 16. Between the side walls 10 and 11 and the aprons 16, there are provided a plurality of transverse rows of vehicle receiving cells, such transverse rows being indicated generally by the numeral 17. Such cells are also arranged in longitudinal rows 18 extending between the aprons 16 while the transverse rows extend between the side walls 10 and 11. As presented by Fig. 1 of the drawing, each of the rows 17 and 18 are formed by vertically disposed cells 20, the height of which is determined by the height of the columns 33 hereinafter discussed which are preferably sufficient to provide for the vertically spaced superposition of a plurality of motor vehicles. It is also contemplated that, as indicated in Figs. 2 and 3, the building will be provided with a basement or sub-floor beneath the level of the aprons 16 and of such height as to permit free passage under all the cells of a suitable mobile lifting unit hereinafter to be described.

Within each of the cells 20, there is provided a vertically elongate and vertically reciprocable vehicle receiving lift generally indicated by the numeral 20 and provided with a top platform 21 and intermediate spaced floors or vehicle receiving platforms 22 and a lower platform 24 which is adapted to receive the force of the mobile lifting unit hereinafter described. From the structure thus shown in Figs. 1 and 2, it will be seen that each of the lifts 20 includes vertically superposed motor vehicle receiving chambers 25 of sufficient dimensions both longitudinally and transversely to readily receive a motor vehicle as indicated by the numeral 26.

In the construction of such a facility as herein contemplated, the lifts are preferably open on all four sides and are defined by corner angle pieces 30 to which floor 35' and ceiling transverse beam 31 are secured. As seen in Fig. 4, transverse beam 31 inwardly joins longitudinal beam 35 to provide support for floor plate 35' positioned substantially beneath the wheels of the motor vehicle placed thereon. Cells may be defined by suitable transverse and longitudinal girders 32 joined by central rectangular column indicated at 33, the corners of the column being provided with vertical angle guide pieces 34 which may receive the guides 30 of the individual lifts.

By the construction thus far presented, it will be seen that assuming the level of the apron 16 to be that of the floor arrangement indicated at 37 in Figs. 2 and 3, vertical reciprocation of the lift 20 will provide for selective registration of the horizontal floor ceiling members with the level 37 as desired. In the operation of the device, assuming the lower member 24 to be in registration with the level 37, a motor vehicle may be driven thereon and thereafter the lift may be lowered to receive in superposed relation to the first vehicle, a second vehicle disposed on the next above transverse floor section 22. Or as desired, it may be assumed that the upper level 37 is in the plane of the apron 16 in which case the lowermost position of the lift will bring the surface of the top member 21 in registration with the surface 37 and thus the motor vehicle may be driven thereon. Thereafter, an elevation of the lift will successively bring the floor 22 in registration with the surface 37 to successively receive the motor vehicle thereon. When the vehicles are to be discharged from their stored position on the lift, the lift may be brought into selective registration of its elected level with that of the apron 16 at which time the motor vehicle may be discharged from the lift under its own power.

While the invention is not here limited or confined to the specific mode of elevating the lift members, it is a part of the present invention to provide in conjunction with such lift members a mobile hydraulic lifting apparatus comprising a steerable self-propelled vehicle, as indicated at 38, to which is mounted a vertical telescopic hydraulically actuated lifting ram 39, the upper end 40 of which is adapted to be selectively engaged at a central point on the bottom of the floor 24 of any desired lift, and a lower ram 41 is provided which may engage suitable foundation work as indicated at 42 so that when lifting power is applied force will be directed from the foundation 42 against the lift to provide for the elevation thereof to the desired registration of an elective floor thereof with the level of vehicle ingress or egress to such lift.

In the construction of the present invention, it will of course be understood that various structural details well within the skill of those versed in the art may be provided for such as securing means for selective elevations, counter-balance means to facilitate the action of the ram 39 and suitable chocks and securing means to prevent accidental movement of the vehicle upon its selected floor of the lift, and the like.

From consideration of the foregoing, it will be understood that since the lifts are primarily comprised of the corner angle members 30 which are extended below the lower level 24 as indicated at 43, the lifts even when at rest in fully downward position will not constitute any preclusion of the free travel of such lifting trucks as indicated at 38 from any one of a transverse series of cells or from any one of a horizontal series of cells. Thus in the operation of the device, only one or a few lifting trucks may be required to serve the entire facility. When any one particular lift has been moved to its required position for the reception or discharge of a vehicle through the vertical motion thereof within its cell, the lifting truck may then be operated to lower that lift to its position of rest and then withdraw its ram 40, as shown at the left in Fig. 2, and thus be free to travel beneath another selected lift whereupon it may engage such other selected lift to provide lifting thereof so that the level of the floor upon which a car is to be received or removed may be readily placed in registration with the plane of the apron 16.

Considering the present invention, it will be understood that while the concept contemplates not only the design and construction of the facility itself but of the construction and arrangement therein, as well as the concept of providing a selectively operable lifting truck registrable with any of the selected lifts of the cellular construction, the invention is not limited or confined to the suggested structural details or arrangements herein shown and therefore numerous changes, modifications and the full use of equivalents may be resorted to in the practice of the invention without departing from the scope of the appended claim.

I claim:

A car parking structure comprising an apron, a plurality of car lifts, each of said lifts having a plurality of vertically arranged car receiving platforms, said platforms being disposed in parallel horizontal planes, each of said lifts being movable for selective registration of said platforms with said apron, a floor spaced below the lowermost platforms in each of said lifts, a self propelled vehicle movably carried by said floor, a telescoping hydraulic lifting ram mounted on said vehicle, said vehicle being movable on said floor beneath all of said lifts, the upper end of said hydraulic lifting ram being selectively engageable with any one of the lowermost platforms to raise and lower the lift of that platform, foundation work beneath each of said lifts, and means on said vehicle for engaging said foundation work for reaction against force of said ram when said ram raises said lift.

References Cited in the file of this patent

UNITED STATES PATENTS

| | | |
|---|---|---|
| 1,160,379 | Conrad | Nov. 16, 1915 |
| 1,303,978 | Smith | May 20, 1919 |
| 1,527,562 | Kolbe | Feb. 24, 1925 |
| 1,667,467 | Young | Apr. 24, 1928 |
| 1,668,337 | Ross et al. | May 1, 1928 |
| 2,596,462 | Ball | May 13, 1952 |
| 2,620,932 | Alpine | Dec. 9, 1952 |
| 2,627,942 | Nash et al. | Feb. 10, 1953 |
| 2,672,997 | Merck | Mar. 23, 1954 |
| 2,727,638 | Sestan | Dec. 20, 1955 |

FOREIGN PATENTS

| | | |
|---|---|---|
| 1,068,480 | France | Feb. 3, 1954 |